(12) United States Patent
Lee et al.

(10) Patent No.: US 12,341,357 B2
(45) Date of Patent: Jun. 24, 2025

(54) ELECTRONIC DEVICE FOR TRANSMITTING WIRELESS POWER AND OPERATING METHOD THEREFOR

(71) Applicant: SAMSUNG ELECTRONICS CO., LTD., Suwon-si (KR)

(72) Inventors: Sangwook Lee, Suwon-si (KR); Sungbum Park, Suwon-si (KR); Hyunseok Shin, Suwon-si (KR); Youngho Ryu, Suwon-si (KR); Kyungmin Lee, Suwon-si (KR); Cheonyong Lim, Suwon-si (KR); Jinsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 18/124,963

(22) Filed: Mar. 22, 2023

(65) Prior Publication Data

US 2023/0231424 A1 Jul. 20, 2023

Related U.S. Application Data

(63) Continuation of application No. PCT/KR2021/012748, filed on Sep. 17, 2021.

(30) Foreign Application Priority Data

Oct. 12, 2020 (KR) .................. 10-2020-0131434

(51) Int. Cl.
*H02J 50/90* (2016.01)
*H02J 50/10* (2016.01)
*H02J 50/60* (2016.01)

(52) U.S. Cl.
CPC .............. *H02J 50/90* (2016.02); *H02J 50/10* (2016.02); *H02J 50/60* (2016.02)

(58) Field of Classification Search
CPC .. H02J 50/90; H02J 50/10; H02J 50/60; H02J 50/00; H02J 50/12; H02J 50/402;
(Continued)

(56) References Cited

U.S. PATENT DOCUMENTS

2009/0001932 A1* 1/2009 Kamijo ............... G01V 3/10
320/108
2011/0226756 A1 9/2011 Arnal Valero et al.
(Continued)

FOREIGN PATENT DOCUMENTS

JP 2012-90373 A 5/2012
JP 2017-55529 A 3/2017
(Continued)

OTHER PUBLICATIONS

International Search Report (PCT/ISA/210) issued by the International Searching Authority on Dec. 28, 2021 in International Application No. PCT/KR2021/012748.
(Continued)

*Primary Examiner* — Richard Tan
(74) *Attorney, Agent, or Firm* — Sughrue Mion, PLLC

(57) ABSTRACT

Disclosed is an electronic device including a plurality of sensing coils for sensing an external device; a power transmitting coil for transmitting power to the external device; and a processor configured to: sequentially apply, to the power transmitting coil, powers having magnitudes respectively set to correspond to the plurality of sensing coils, and during a period in which power corresponding to each sensing coil of the plurality of sensing coils among the powers is applied, identify induction voltages respectively induced in the plurality of sensing coils, and sense the external device located on a wireless power transmitting device, on the basis of the identified induction voltages.

12 Claims, 12 Drawing Sheets

(58) Field of Classification Search
CPC .......... H02J 50/40; H02J 50/80; H02J 50/005; H01F 38/14
USPC .......................................................... 307/104
See application file for complete search history.

(56) References Cited

U.S. PATENT DOCUMENTS

| | | |
|---|---|---|
| 2012/0091989 A1 | 4/2012 | Uramoto et al. |
| 2016/0020642 A1 | 1/2016 | Liu et al. |
| 2017/0141606 A1* | 5/2017 | Yamanishi ............ H02J 7/0044 |
| 2017/0310166 A1 | 10/2017 | Huang et al. |
| 2018/0166905 A1 | 6/2018 | Park et al. |
| 2018/0242407 A1 | 8/2018 | Iida et al. |
| 2019/0124727 A1 | 4/2019 | Moon et al. |
| 2019/0385788 A1 | 12/2019 | Arisawa et al. |
| 2020/0200937 A1 | 6/2020 | Widmer et al. |

FOREIGN PATENT DOCUMENTS

| | | | |
|---|---|---|---|
| KR | 10-2011-0103427 A | | 9/2011 |
| KR | 10-2016-0132585 A | | 11/2016 |
| KR | 10-1854788 B1 | | 5/2018 |
| KR | 10-2018-0097418 A | | 8/2018 |
| KR | 20180097418 | * | 8/2018 |
| KR | 10-2019-0043984 A | | 4/2019 |
| WO | 2007/107888 A2 | | 9/2007 |
| WO | 2019/204379 A1 | | 10/2019 |

OTHER PUBLICATIONS

Written Opinion (PCT/ISA/237) issued by the International Searching Authority on Dec. 28, 2021 in International Application No. PCT/KR2021/012748.

Communication issued Nov. 14, 2024 by the Korean Intellectual Property Office in Korean Patent Application No. 10-2020-0131434.

* cited by examiner

ELECTRONIC DEVICE FOR TRANSMITTING WIRELESS POWER AND OPERATING METHOD THEREFOR

CROSS-REFERENCE TO RELATED APPLICATIONS

This application is a bypass continuation of International Application No. PCT/KR2021/012748, filed on Sep. 17, 2021, which is based on and claims priority to Korean Patent Application No. 10-2020-0131434, filed on Oct. 12, 2020, the disclosures of which are incorporated by reference herein in their entireties.

BACKGROUND

1. Field

The disclosure relates to an electronic device for transmitting wireless power and a method of operating the same.

2. Description of Related Art

Induction cooktops are widely used, which may reduce indoor air pollution and decrease an indoor temperature rise without exhaust gas emission. An induction cooktop may heat a heating target in an electromagnetic induction heating scheme.

In an electromagnetic induction heating system, an alternating magnetic field is generated around a coil included in a wireless power transmitter by an alternating current (AC) current flowing in the coil, and an eddy current is formed in a heating target according to Faraday's law by the alternating magnetic field. Resistance to this eddy current causes heat.

The Wireless Power Consortium has recently established a wireless power standard for kitchen appliances (Ki Cordless Kitchen (hereafter, referred to as the Ki standard)). When an object that is not a power transmission target, such as a key, a telephone, a bank card, and so on, is placed at the position of a power transmitter, devices conforming to the Ki standard should not transfer power to the object.

When a foreign material exists on a wireless power transmitter, the foreign material may decrease the wireless power transmission efficiency of the wireless power transmitter or damage the wireless power transmitter.

Accordingly, there may be a need for a technique of sensing an object existing on a wireless power transmitter and determining whether the object is a power transmission target.

An electronic device for transmitting wireless power and a method of operating the same according to various embodiments of the disclosure may sense an external device (e.g., a foreign material) present on a wireless power transmitter by using a sensing coil and determine the type of the sensed external device.

SUMMARY

Provided is an electronic device for transmitting wireless power and a method of operating the same may be provided. Accordingly, a foreign material existing on a wireless power transmitter may be sensed, thereby preventing a decrease in wireless power transmission efficiency and damage to the wireless power transmitter.

In addition, provided is an electronic device and a method of operating the same may be provided, which may sense an external device (e.g., a target device for heating or a target device for communication) existing on a wireless power transmitter. Therefore, appropriate power may be transmitted according to the type of the external device.

According to an aspect of the disclosure, a wireless power transmission device includes: a plurality of sensing coils configured to sense an external device; a power transmission coil configured to transmit power to the external device; and a processor configured to: sequentially apply powers having magnitudes set to respectively correspond to each sensing coil of the plurality of sensing coils to the power transmission coil, identify an induction voltage induced in each sensing coil of the plurality of sensing coils during a period in which the power corresponding to each sensing coil of the plurality of sensing coils among the powers is applied, and sense the external device located on the wireless power transmission device based on the identified induction voltages.

The induction voltage induced in each sensing coil of the plurality of sensing coils during the period in which the power corresponding to each sensing coil of the plurality of sensing coils among the powers is applied may be a preset value based on the external device not being disposed on the wireless power transmission device.

The processor may be further configured to identify and store a magnitude of each of the powers leading to measurement of the induction voltage induced in each of the plurality of sensing coils as a preset value.

The processor may be further configured to determine that the external device is sensed based on the induction voltage induced in each sensing coil of the plurality of sensing coils during the period in which the power corresponding to each sensing coil of the plurality of sensing coils among the powers is applied being different from a preset value by at least a predetermined amount.

The processor may be further configured to determine a type of the sensed external device by comparing a pre-stored pattern with the induction voltage induced in each sensing coil of the plurality of sensing coils during the period in which the power corresponding to each sensing coil of the plurality of sensing coils among the powers is applied.

The processor may be further configured to stop the transmission of the power based on it being determined that the type of the sensed external device is a foreign material, and the sensed external device being continuously sensed for at least a preset amount of time.

The processor may be further configured to determine that the external device is not located on the wireless power transmission device and stop the transmission of the power, based on the sensed external device not being sensed for at least a preset amount of time.

The processor may be further configured to sequentially apply the powers having the magnitudes set to respectively correspond to each sensing coil of the plurality of sensing coils to the power transmission coil according to a preset period.

Frequencies of the powers sequentially applied to the power transmission coil according to the preset period to sense the external device may be different from a frequency of a power applied to the power transmission coil to transmit the power to the external device.

The processor may be further configured to decrease a magnitude of the power applied to the power transmission coil to transmit the power to the external device to a preset magnitude or less, based on the powers being sequentially applied to the power transmission coil according to the preset period to sense the external device.

According to an aspect of the disclosure, a method of operating a wireless power transmission device including a plurality of sensing coils for sensing an external device, and a power transmission coil transmitting power to the external device, includes: sequentially applying powers having magnitudes set to respectively correspond to each sensing coil of the plurality of sensing coils to the power transmission coil, identifying an induction voltage induced in each sensing coil of the plurality of sensing coils during a period in which the power corresponding to each sensing coil of the plurality of sensing coils among the powers is applied, and sensing the external device located on the wireless power transmission device based on the identified induction voltages.

The induction voltage induced in each sensing coil of the plurality of sensing coils during the period in which the power corresponding to each sensing coil of the plurality of sensing coils among the powers is applied is a preset value based on the external device not being disposed on the wireless power transmission device.

The method may include identifying and storing a magnitude of each of the powers leading to measurement of the induction voltage induced in each of the plurality of sensing coils as a preset value.

Sensing the external device may include determining that the external device is sensed based on the induction voltage induced in each sensing coil of the plurality of sensing coils during the period in which the power corresponding to each sensing coil of the plurality of sensing coils among the powers is applied being different from a preset value by a at least a predetermined amount.

The method may include determining a type of the sensed external device by comparing a pre-stored pattern with the induction voltage induced in each sensing coil of the plurality of sensing coils during the period in which the power corresponding to each sensing coil of the plurality of sensing coils among the powers is applied.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure will be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
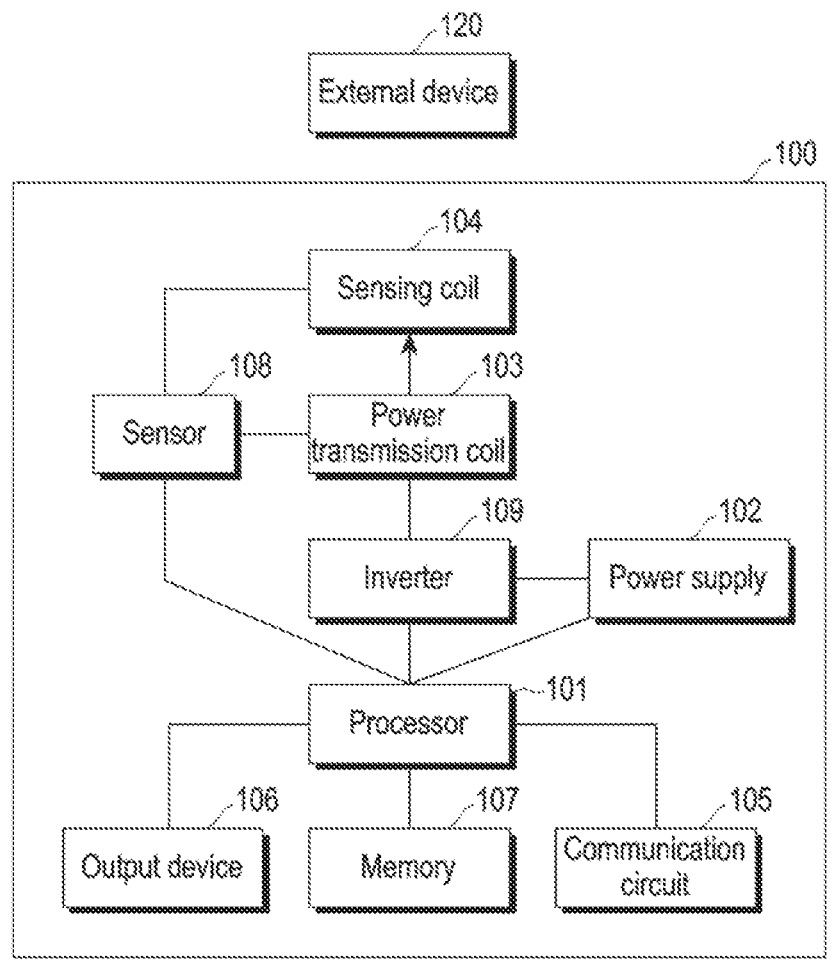
FIG. 1 is a block diagram illustrating an electronic device and an external device included in a wireless power transmission system, according to an embodiment.

FIG. 1 is a block diagram illustrating an electronic device and an external device included in a wireless power transmission system, according to an embodiment.

According to an embodiment, the wireless power transmission system may include an electronic device 100. The wireless power transmission system may include an external device 120 that wirelessly receives power from the electronic device 100. The electronic device 100 may heat the external device 120 or wirelessly charge the external device 120.

For example, when heating the external device 120, the electronic device 100 may generate a magnetic field to generate heat in the external device 120. As an eddy current flows on the surface of the external device 120 due to a magnetic field having a time-variant magnitude formed in the vicinity, heat may be generated. Accordingly, the external device 120 may be heated by the electronic device 100. For example, the electronic device 100 may generate power (e.g., a magnetic field) to heat the external device 120 based on a mode selection (or reception of a user input) for heating the external device 120.

For example, when charging the external device 120 wirelessly, the electronic device 100 may transmit charging power according to a resonance scheme. In the case of the resonance scheme, the electronic device 100 may include, for example, a power source, a direct current (DC)-alternating current (AC) conversion circuit, an amplifier circuit, an impedance matching circuit, at least one capacitor, at least one coil, and an out-band communication circuit (e.g., Bluetooth low energy (BLE) communication circuit), and so on. At least one capacitor and at least one coil may form a resonance circuit. The electronic device 100 may be implemented in a manner defined in, for example, the air fuel alliance (AFA) standard (or alliance for wireless power (A4WP) standard).

For example, the electronic device 100 may transmit power according to an induction scheme. In the case of the induction scheme, the electronic device 100 may include, for example, a power source, a DC-AC conversion circuit, an amplifier circuit, an impedance matching circuit, at least one capacitor, at least one coil, a communication modulation/demodulation circuit, and so on. The electronic device 100 may be implemented in a manner defined in the wireless power consortium (WPC) standard (e.g., Qi standard or Ki standard).

According to an embodiment, the electronic device 100 may be configured to perform wireless power transmission based on one of the resonance scheme and the induction scheme. Alternatively, the electronic device 100 may be configured to support both the resonance scheme and the induction scheme.

An eddy current may flow on the surface of the external device 120 by a magnetic field having a time-variant magnitude around it, and the external device 120 may be heated by the eddy current. A process of heating the external device 120 by the eddy current flowing on the surface of the external device 120 may be expressed as wireless power reception of the external device 120. The electronic device 100 may include at least one coil capable of generating an induced magnetic field when a current (e.g., AC) flows according to the resonance scheme and/or the induction scheme. A process of generating an induced magnetic field through a coil by the electronic device 100 may be expressed as wireless power transmission of the electronic device 100. In addition, the external device 120 may include a coil in which an induced electromotive force is generated by a magnetic field having a time-variant magnitude around it. A process of outputting an AC current from the coil of the external device 120 or applying an AC voltage to the coil according to generation of the induced electromotive force in the coil may be expressed as wireless power reception of the external device 120.

According to an embodiment, the electronic device 100 may communicate with the external device 120. For example, the electronic device 100 may communicate with the external device 120 in an out-band manner based on the resonance scheme. The electronic device 100 or the external device 120 may transmit/receive data using a communication circuit (e.g., BLE communication module) provided separately from the coil or a patch antenna. The electronic device 100 may transmit media data, and depending on implementation, each of a plurality of different communication circuits (e.g., a BLE communication module, a Wi-fi module, and a Wi-gig module) may transmit and receive media data and a wireless power transmission/reception control signal. For example, the electronic device 100 may communicate with the external device 120 in an in-band manner based on the induction scheme. The electronic device 100 or the external device 120 may change the load (or impedance) of data to be transmitted according to, for example, an on/off keying modulation scheme. The electronic device 100 or the external device 120 may determine data transmitted from the other party by measuring a load change (or impedance change) based on a change in the magnitude of the current, voltage, or power of the coil.

Referring to FIG. 1, the electronic device 100 may include a power transmission coil 103, a sensing coil 104, a processor 101, a power supply 102, an inverter 109, a sensor 108, a communication circuit 105, an output device 106, and memory 107.

According to an embodiment, the power supply 102 may supply DC power to the inverter 109. The provision of DC power may be understood as at least one of application of a DC voltage or application of a DC current. The power supply 102 may receive power from at least one of a DC power source or an AC power source and output DC power. The power supply 102 may be controlled by the processor 101, and the processor 101 may control the power supply 102 to supply power to the inverter 109 based on a set output level.

According to an embodiment, the inverter 109 may output AC power by using the DC power received from the power supply 102. The output of AC power may be understood as at least one of application of an AC voltage or application of an AC current. The inverter 109 may provide the AC power to the power transmission coil 103. The inverter 109 may be controlled by the processor 101, and the processor 101 may control the inverter 109 to provide power to the power transmission coil 103 based on a set output level. The inverter 109 may control at least one of the width, duty cycle, or power level of an output pulse. Alternatively, the processor 101 may control the output level of the power supply 102.

According to an embodiment, the power transmission coil 103 may transmit power wirelessly to the outside by using the AC power received from the inverter The wireless power transmission to the outside may be understood as a process of generating an induced magnetic field from the power transmission coil 103 by applying a current to the power transmission coil 103 in the electronic device 100.

According to an embodiment, the processor 101 may sense the external device 120 based on a result of sensing the sensing coil 104. In the sensing coil 104, an induced electromotive force may be generated by a magnetic field having a time-variant magnitude formed around it. For example, when an induced electromotive force is generated in the sensing coil 104, the electronic device 100 may sense the external device 120 by identifying the sensed magnitude (e.g., induction voltage) of the sensing coil 104.

According to an embodiment, the sensor 108 may sense at least one of a voltage, current, power, or impedance applied to the power transmission coil 103. The sensor 108 may sense at least one of a voltage, current, power, or impedance applied to the sensing coil 104. According to one embodiment, the sensor 108 may include a switch. The sensor 108 may sequentially sense a plurality of coils using the switch. For example, when there are a plurality of sensing coils 104 included in the electronic device 100, the sensor 108 may sense the plurality of sensing coils 104 at least simultaneously, or sequentially using the switch. In another example, the sensor 108 may sense the plurality of coils of the sensing coil at least simultaneously.

According to an embodiment, the processor 101 may be implemented as, but not limited to, a microprocessor or a micro controlling unit (MCU). Alternatively, the processor 101 may be implemented as a field programmable gate array (FPGA) or a set of analog devices. The processor 101 may transmit an electrical signal to or receive an electrical signal from another component of the electronic device 100. In this specification, when it is said that the electronic device 100 or the processor 101 performs an operation through another component of the electronic device 100, this may imply that the processor 101 transmits an electrical signal for causing the operation to be performed to another component or receives an electrical signal generated as a result of performing the operation from another component.

According to one embodiment, the memory 107 may load commands or data received by the processor 101 from another component (e.g., the sensor 108 or the communication circuit 105) and store resulting data.

According to an embodiment, the communication circuitry 105 may communicate with other entities in various manners. The communication circuit 105 may be controlled by the processor 101, and the processor 101 may receive, from the external device 120, a signal for adjusting the output level of the power transmission coil 103 of the electronic device 100. The processor 101 may receive sensing information such as a current temperature of the external device 120 through the communication circuit 105. The processor 101 may be implemented to adjust the amount of output power based on the received sensing information.

According to an embodiment, the output device 106 may output state information about the electronic device 100 or state information about the external device 120 received by the electronic device 100. For example, the output device 106 may include a display device or an audio output device. The display device may visually provide information to the outside (e.g., a user) of the electronic device 100. The audio output device may be a device that outputs voice based on an electrical signal. The audio output device may be, for example, a speaker.

While not shown in FIG. 1, the electronic device 100 may further include an input device to receive a command or data from the outside (e.g., user) of the electronic device 100 according to an embodiment. For example, the input device may include at least one of a keyboard to receive a specific temperature input, a button to set an output level, or a touch input device.

Figure 2:
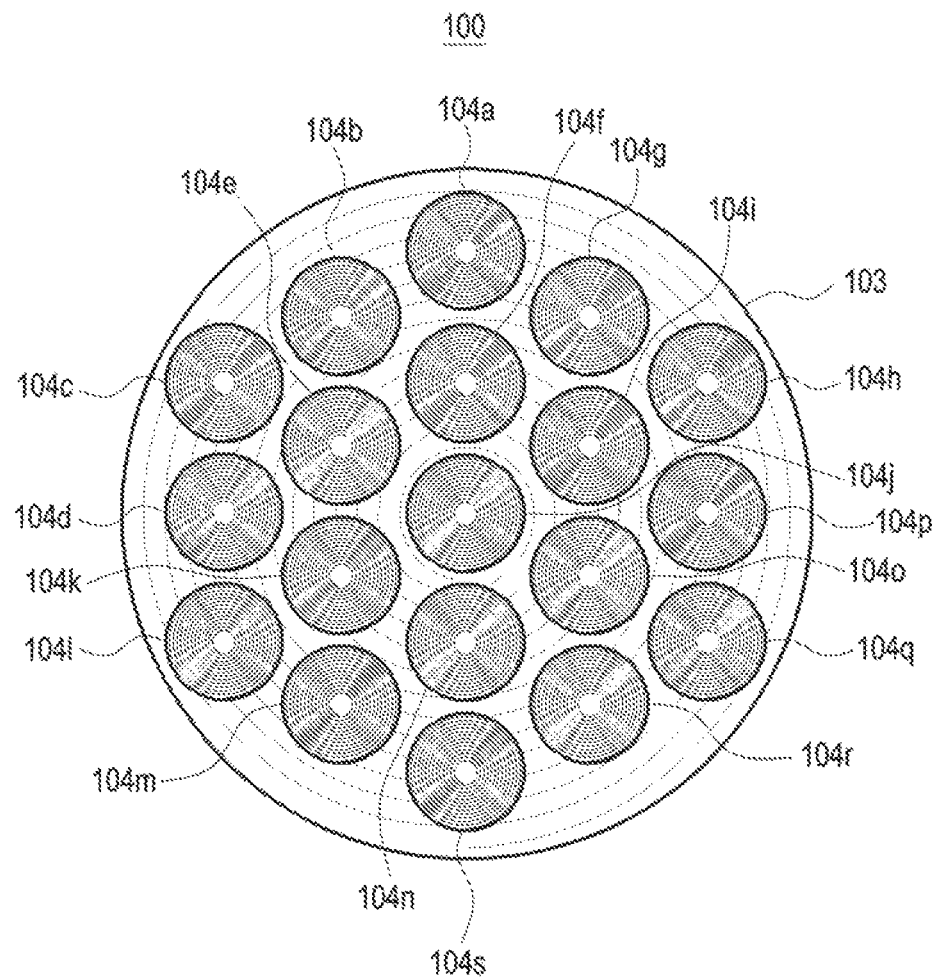
FIG. 2 is a diagram illustrating a configuration of an electronic device, according to an embodiment.

FIG. 2 is a diagram illustrating a configuration of an electronic device, according to an embodiment.

Referring to FIG. 2, the electronic device 100 may include the power transmission coil 103 and a sensing coil 104. For example, the sensing coil 104 may include a plurality of sensing coils 104a, 104b, to 104s. Although the power transmission coil 103 is shown as singular, this is exemplary and the number of power transmission coils is not limited.

According to an embodiment, the power transmission coil 103 may form one layer in the electronic device 100. Layers of the plurality of sensing coils 104a, 104b, to 104s may be different from the layer of the power transmission coil 103. For example, the layers formed by the plurality of sensing coils 104a, 104b, to 104s may be located on the layer formed by the power transmission coil 103, which should not be construed as limiting. The layers formed by the plurality of sensing coils 104a, 104b, to 104s may be disposed in contact with or spaced apart from the layer formed by the power transmission coil 103. The number or arrangement of the plurality of sensing coils 104a, 104b, to 104s included in the electronic device 100 is not limited to FIG. 2.

According to an embodiment, the plurality of sensing coils 104a, 104b, to 104s may be respectively connected to the sensor 108. For example, the electronic device 100 (e.g., the processor 101) may use the sensor 108 to sense at least one of a voltage, current, power, or impedance applied to each of the plurality of sensing coils 104a, 104b, to 104s connected to the sensor 108. According to an embodiment, the electronic device 100 may simultaneously or sequentially sense the plurality of sensing coils 104a, 104b, to 104s connected to the sensor 108 using the sensor 108. For example, when the inverter 109 applies power to the power transmission coil 103 in the electronic device 100, the electronic device 100 may identify an induction voltage induced in each of the sensing coils 104a, 104b, to 104s by a magnetic field having a time-variant magnitude formed around the power transmission coil 103. In this case, for example, the electronic device 100 may sequentially identify the induction voltages induced in the plurality of sensing coils 104a, 104b, to 104s.

Figure 3:
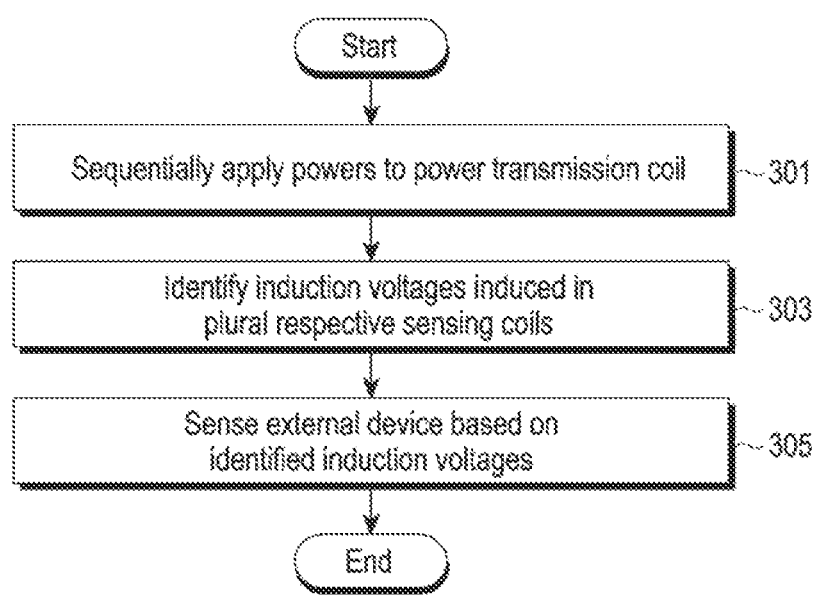
FIG. 3 is a flowchart illustrating a method of operating an electronic device, according to an embodiment.

FIG. 3 is a flowchart illustrating a method of operating an electronic device, according to an embodiment.

Referring to FIG. 3, according to an embodiment, the electronic device 100 (e.g., the processor 101) may sequentially apply powers to the power transmission coil 103 in operation 301. For example, the electronic device 100 may sequentially apply powers having magnitudes set in correspondence with the plurality of sensing coils 104a, 104b, to 104s to the power transmission coil 103. For example, the electronic device 100 may apply a first power having a first magnitude set in correspondence with the first sensing coil 104a to the power transmission coil 103. In this case, a first induction voltage may be applied to the first sensing coil 104a. Then, the electronic device 100 may apply a second power having a second magnitude set in correspondence with the second sensing coil 104b to the power transmission coil 103. In this case, a second induction voltage may be applied to the second sensing coil 104b. In a similar manner, the electronic device 100 may then sequentially apply powers to the third, fourth, to $n^{th}$ sensing coils 104c, 104d, to 104s. While the powers are applied, induction voltages may be applied to the sensing coils. The first magnitude of the first power, and the second magnitude of the second power to the $n^{th}$ magnitude of the $n^{th}$ power may be equal to or different from each other. The magnitude (e.g., the first magnitude to the $n^{th}$ magnitude) of each of the first power to the $n^{th}$ power may be pre-calibrated such that the induction voltages (e.g., the first induction voltage to the $n^{th}$ induction voltage) of the plurality of sensing coils 104a, 104b, to 104s have the same magnitude, and the calibration process will be described later. The electronic device 100 may store information about the calibrated first to $n^{th}$ magnitudes, and sequentially apply the powers having the plurality of magnitudes of operation 301 to the power transmission coil 103 based on the stored information.

In operation 303, the electronic device 100 may identify the induction voltages induced in the plurality of respective sensing coils 104a, 104b, to 104s. While operation 303 is shown in FIG. 3 as performed after operation 301 is completed, this is merely for illustrative purposes. More specifically, according to an embodiment, the electronic device 100 may identify the induction voltage induced in each of the plurality of sensing coils 104a, 104b, to 104s during a time period in which a corresponding power is applied to the sensing coil. For example, while a specific power (e.g., the first power) having a specific magnitude (e.g., the first magnitude) is applied to the power transmission coil 103, the electronic device 100 may sense a sensing coil (e.g., the first sensing coil 104a). The electronic device 100 may identify an induction voltage (e.g., the first induction voltage) induced in the specific sensing coil (e.g., the first sensing coil 104a) during a time period in which the power (e.g., the first power) having the magnitude (e.g., the first magnitude) set in correspondence with the specific sensing coil (e.g., the first sensing coil 104a) is applied to the power transmission coil 103. In this case, for example, the electronic device 100 may identify only the first induction voltage applied to the first sensing coil 104a while the first power is applied. For example, in the case where the sensor 108 is sequentially connected to the plurality of sensing coils 104a, 104b, to 104s through the switch, the processor 101 may control the switch to connect a specific coil to the sensor 108, while a specific current corresponding to the specific coil is applied to the power transmission coil 103. In another example, although the electronic device 100 may identify the induction voltages induced in the plurality of sensing coils 104a, 104b, to 104s while the first power is applied, the electronic device 100 may identify only the first induction voltage induced in the first sensing coil 104a as a valid induction voltage. For example, when the sensor 108 is connected to the plurality of sensing coils 104a, 104b, to 104s all the time, the processor 101 may identify a result of sensing the specific coil while the specific current corresponding to the specific coil is applied to the power transmission coil 103. After sensing the specific sensing coil (e.g., the first sensing coil 104a), the electronic device 100 may sense the next sensing coil (e.g., the second sensing coil 104b). Accordingly, the electronic device 100 may sequentially sense the plurality of sensing coils 104a, 104b, to 104s.

In operation 305, the electronic device 100 may sense the external device 120 based on the identified induction voltages. According to an embodiment, the electronic device 100 may sense the external device 120 located on a specific sensing coil. For example, when the induction voltage (e.g., the first induction voltage) induced in the specific sensing coil (e.g., the first coil 104a) is different from a preset value by a certain value or more, the electronic device 200 may determine that the external device 120 is located on the specific sensing coil (e.g., the first coil 104a). For example, when the induction voltages (e.g., the first induction voltage and the second induction voltage) induced in specific sensing coils (e.g., the first coil 104a and the second coil 104b) are different from the preset value by the certain value or more, the electronic device 100 may determine that the external device 120 is located on the specific sensing coils (e.g., the first coil 104a and the second coil 104b). Accordingly, the electronic device 100 may sense the external device 120 and determine the position of the external device 120 based on the identified induction voltages. The electronic device 100 may identify the position of the external device 120 according to the positions of the sensing coils where a change has occurred. When a change occurs in a plurality of sensing coils, the electronic device 100 may also identify the type of the external device 120 (or a foreign material) disposed on the electronic device 100 based on information about the change.

Figure 4:
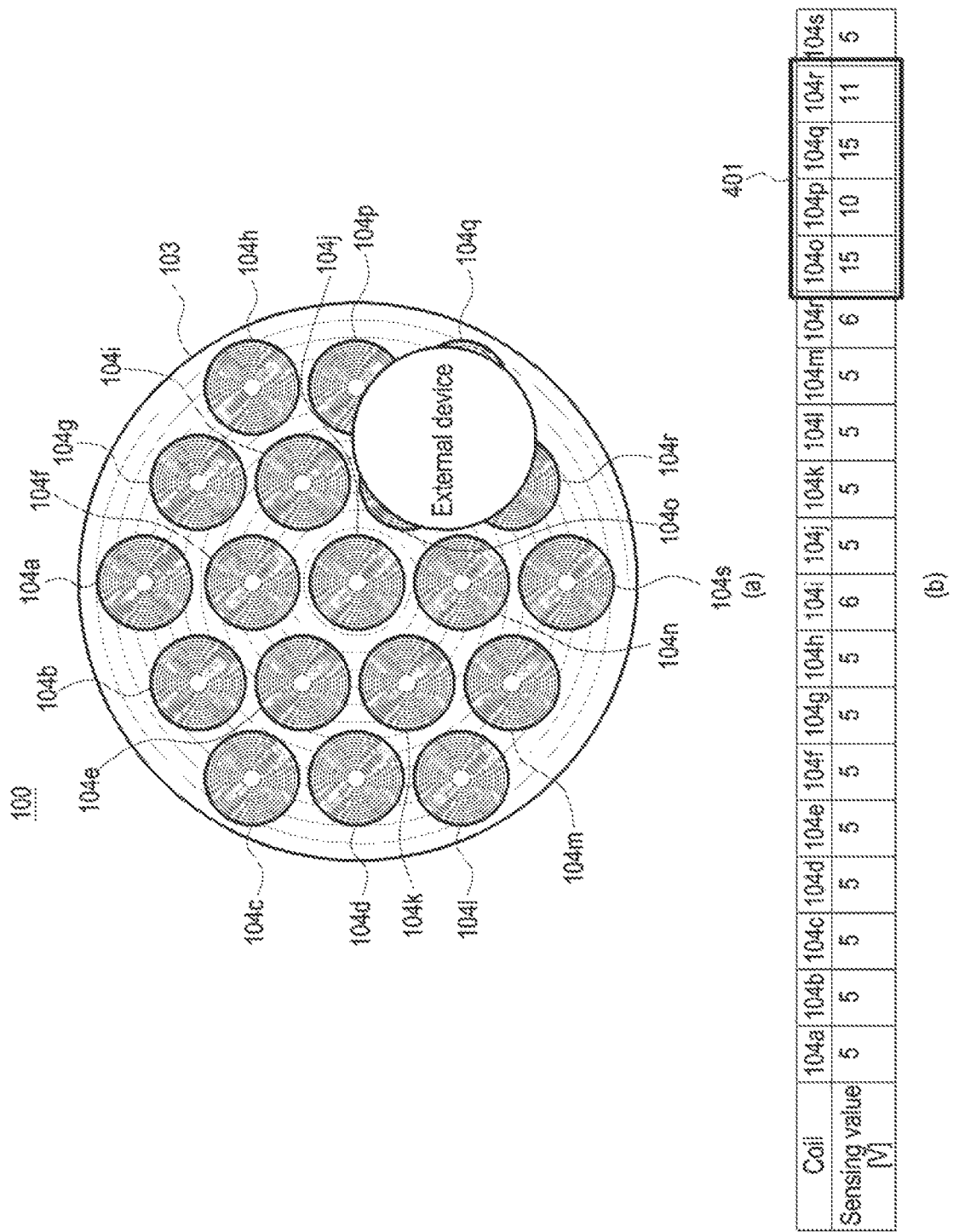
FIG. 4 is a diagram referred for describing a method of operating an electronic device, according to an embodiment.

FIG. 4 is a diagram referred to for describing a method of operating an electronic device, according to an embodiment.

FIG. 4(a) is a diagram illustrating that the external device 120 is located on sensing coils 104o, 104p, 104q, and 104r of the electronic device 100. FIG. 4(b) is a table listing sensing values of the induction voltages induced in the sensing coils 104a, 104b, to 104s. Referring to FIGS. 4(a) and 4(b), the electronic device 100 may sense the external device 120 located on the electronic device 100. For example, referring to FIG. 4(b), the external device 120 is located on the sensing coils 104o, 104p, 104q, and 104r of the electronic device. In this case, the induction voltage induced in the sensing coil 104o is 15[V], the induction voltage induced in the sensing coil 104p is 10[V], the induction voltage induced in the sensing coil 104q is 15[V], and the induction voltage induced in the sensing coil 104r is 11[V]. Based on the induction voltages induced in the sensing coils 104o, 104p, 104q, and 104r being different from a preset value (e.g., 5[V]) by a certain value (e.g., 2[V]) or more, the electronic device 100 may sense the external device 120 and determine that the external device 120 is located on the sensing coils 104o, 104p, 104q, and 104r. Further, based on the induction voltage 6 [V] induced in a sensing coil 104i and the induction voltage 6 [V] induced in a sensing coil 104n not being different from the preset value (e.g., 5[V]) by the certain value (e.g., 2[V]) or more, the electronic device 100 may determine that the external device 120 is not located on the sensing coil 104i and the sensing coil 104n. In the illustrated case of FIG. 4, the induction voltages induced in the plurality of sensing coils 104a, 104b, to 104s are greater than the preset value (e.g., 5[V]), which should not be construed as limiting. A similar description may be applied to the case in which the induction voltages induced in the plurality of sensing coils 104a, 104b, to 104s are less than the preset value (e.g., 5[V]) by a certain value or more.

Figure 5:
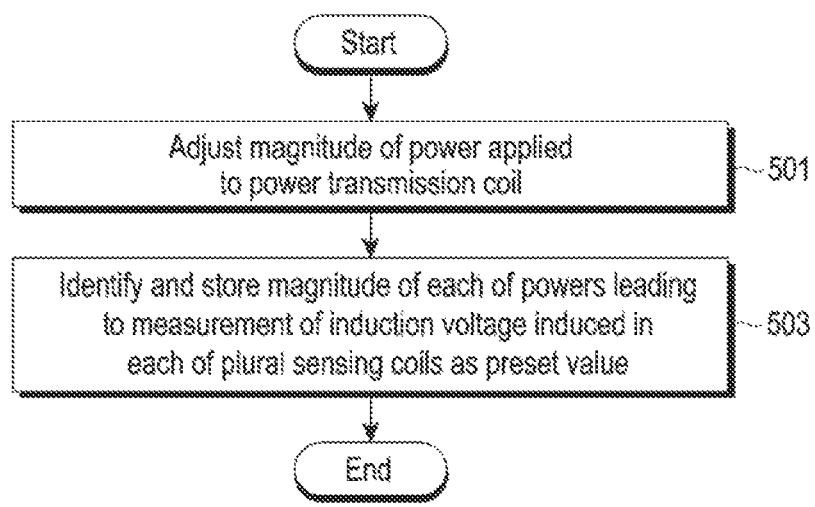
FIG. 5 is a flowchart illustrating a method of operating an electronic device, according to an embodiment.

FIG. 5 is a flowchart illustrating a method of operating an electronic device, according to an embodiment.

Referring to FIG. 5, according to an embodiment, the electronic device 100 (e.g., the processor 101) may adjust the magnitudes of powers applied to the power transmission coil 103 in operation 501.

According to an embodiment, the electronic device 100 may identify and store the magnitudes of powers leading to a preset value as induction voltage measurements of the plurality of sensing coils 104a, 104b, to 104s in operation 503.

Figure 6:
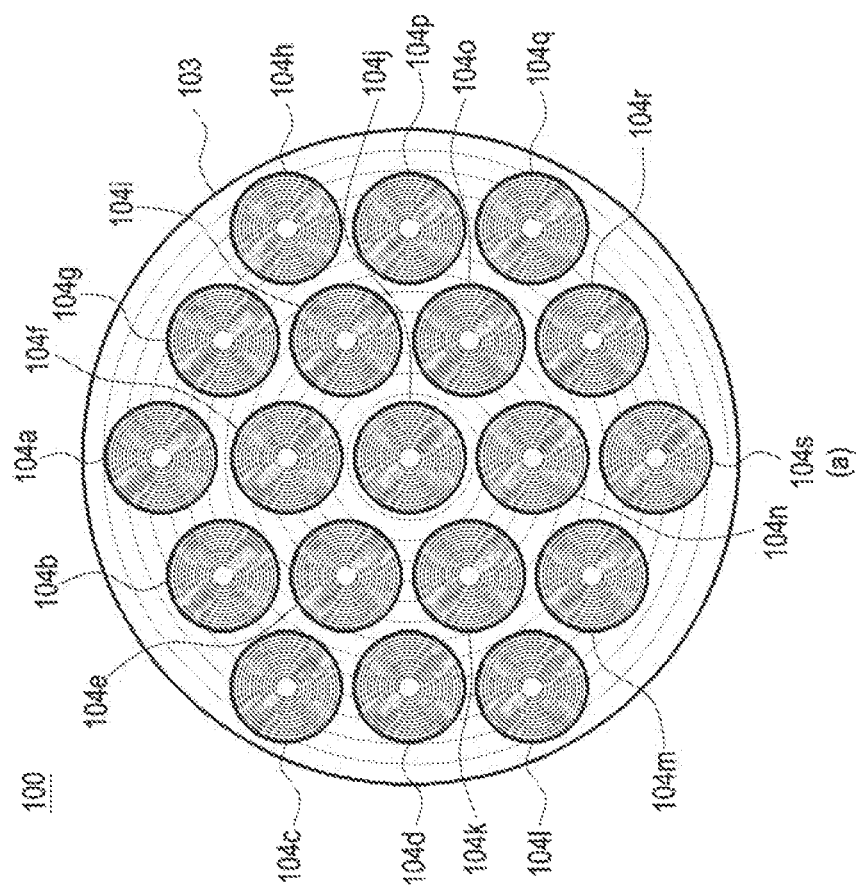
FIG. 6 is a diagram referred to for describing a method of operating an electronic device, according to an embodiment.

The embodiment of FIG. 5 will be described in more detail with reference to FIG. 6. FIG. 6 is a diagram referred to for describing a method of operating an electronic device, according to an embodiment.

FIG. 6(a) is a diagram illustrating a state in which the external device 120 is not disposed on the electronic device 100. FIG. 6(b) is a table listing powers (P1=20 [W], P2=19 [W], to P19=20 [W]) applied to the power transmission coil 130, and sensing values of the induction voltages induced in the plurality of sensing coils 104a, 104b, to 014s, when the powers are applied in the state in which the external device 120 is not disposed on the electronic device 100.

According to an embodiment, when a specific power (e.g., P1) is applied, the electronic device 100 may identify an induction voltage induced in a specific coil (e.g., the coil 104a). After identifying the induction voltage induced in the specific coil (e.g., the coil 104a) when the specific power (e.g., P1) is applied, the electronic device 100 may identify an induction voltage induced in the next specific coil (e.g., the coil 104b), when the next specific power (e.g., P2)) is applied. Accordingly, the electronic device 100 may sequentially sense the plurality of sensing coils 104a, 104b, to 104s.

Referring to FIG. 6(b), for example, in the state in which the external device 120 is not disposed on the electronic device 100, the electronic device 100 may apply a power (e.g., P1) to the power transmission coil 103 by adjusting the magnitude of the power (e.g., P1) according to the operation of FIG. 5 and identify that when the power (e.g., P1) is a specific value (e.g., 20 [W]), the induction voltage induced in a specific coil (e.g., the coil 104a) is a preset value (e.g., 5[V]). Based on the identification that when the power (e.g., P1) is the specific value (e.g., 20 [W]), the induction voltage induced in the specific coil (e.g., the coil 104a) is the preset value (e.g., 5[V]), the induction voltage induced in the specific coil (e.g., the coil 104a), the electronic device 100 may store the specific value (e.g., 20 [W]) of the identified power (e.g., P1) as the magnitude of the power (e.g., P1) set in correspondence with the specific coil (e.g., the coil 104a). Thereafter, the electronic device 100 may repeat the above operation for the next coil. Accordingly, the electronic device 100 may sequentially identify and store the magnitude of a power set in correspondence with each of the plurality of sensing coils 104a, 104b, to 104s.

Even in a state in which the external electronic device 120 is disposed on the electronic device 100 unlike FIG. 6, the embodiment of FIG. 5 may be described similarly to the embodiment of FIG. 6. For example, in the state in which the external device 120 is disposed on the electronic device 100, the electronic device 100 may identify and store the magnitudes of powers leading to a preset value as induction voltage measurements of the plurality of sensing coils 104a, 104b, to 104s.

According to an embodiment, the electronic device 100 may identify and store the magnitudes of powers leading to a preset value as induction voltage measurements of the plurality of sensing coils 104a, 104b, to 104s, and perform operation 301 of FIG. 3 using information about a power having a magnitude set in correspondence with each of the plurality of sensing coils 104a, 104b, to 104s, as illustrated in FIG. 6(b).

Figure 7:
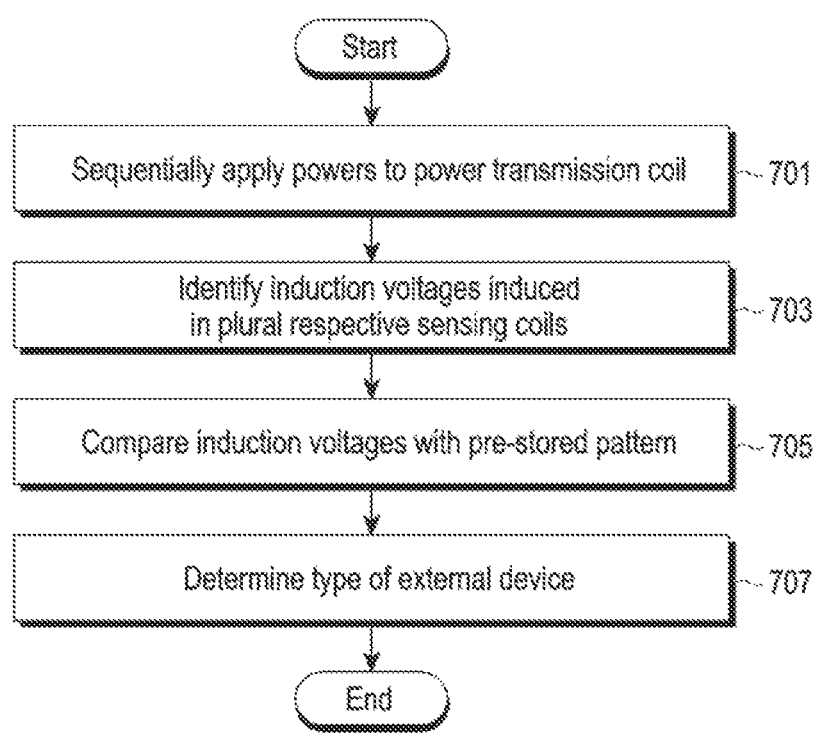
FIG. 7 is a diagram referred to for describing a method of operating an electronic device, according to an embodiment.

FIG. 7 is a diagram referred to for describing a method of operating an electronic device according to an embodiment.

Referring to FIG. 7, according to an embodiment, the electronic device 100 (e.g., the processor 101) may sequentially apply powers to the power transmission coil 103 in operation 701. Operation 701 may be described similarly to operation 301 of FIG. 3, for example.

In operation 703, the electronic device 100 may identify an induction voltage induced in each of the plurality of sensing coils 104a, 104b, to 104s. Operation 703 may be described similarly to operation 303 of FIG. 3, for example.

In operation 705, the electronic device 100 may compare the identified induction voltages with a pre-stored pattern. For example, in the state in which the external device 120 is disposed on the electronic device 100, the electronic device 100 may identify the induction voltages induced in the plurality of sensing coils 104a, 104b, to 104s and compare the identified induction voltages with the pre-stored pattern. According to an embodiment, the pre-stored pattern may be a pattern of the induction voltages induced in the plurality of sensing coils 104a, 104b, to 104s according to the type of the external device 120.

In operation 707, the electronic device 100 may determine the type of the external device 120. For example, in the state in which the external device 120 is disposed on the electronic device 100, the electronic device 100 may identify the induction voltages induced in the plurality of sensing coils 104a, 104b, to 104s, compare the identified induction voltages with the pre-stored pattern, and determine the type of the external device 120 based on a result of the comparison. The pre-stored pattern may have a shape corresponding to the outline of coils in which a change has occurred. The electronic device 100 may identify coils in which a change of a predetermined threshold magnitude or more has occurred, and may determine that a circular kitchen pot is disposed by identifying that the outlines of the coils have a shape corresponding to a circle. Those skilled in the art will understand that the type of the stored pattern or a method of identifying the type is not limited. When the measured change does not correspond to the specified pattern, the electronic device 100 may determine that a foreign material is disposed.

In another embodiment, the electronic device 100 may determine whether a disposed object is a heating target or a foreign material based on the number of coils in which a change of the threshold magnitude or larger has occurred. For example, the heating target has a relatively large area, and when the heating target is disposed on the electronic device 100, a change of the threshold magnitude or larger may occur in a relatively large number of sensing coils. For example, a foreign material has a relatively small area, and when the foreign material is disposed on the electronic device 100, a change of the threshold magnitude or larger may occur in a relatively small number of sensing coils. The electronic device 100 may preset a threshold for the number of coils. When the number of coils in which a change of the threshold magnitude or larger is equal to or greater than the threshold, the electronic device 100 may determine that a heating target is disposed. When the number of coils in which a change of the threshold magnitude or larger is less than the threshold, the electronic device 100 may determine that a foreign material is disposed. The above-described pattern or number-based type determination is merely exemplary, and the determination method is not limited.

Figure 8:
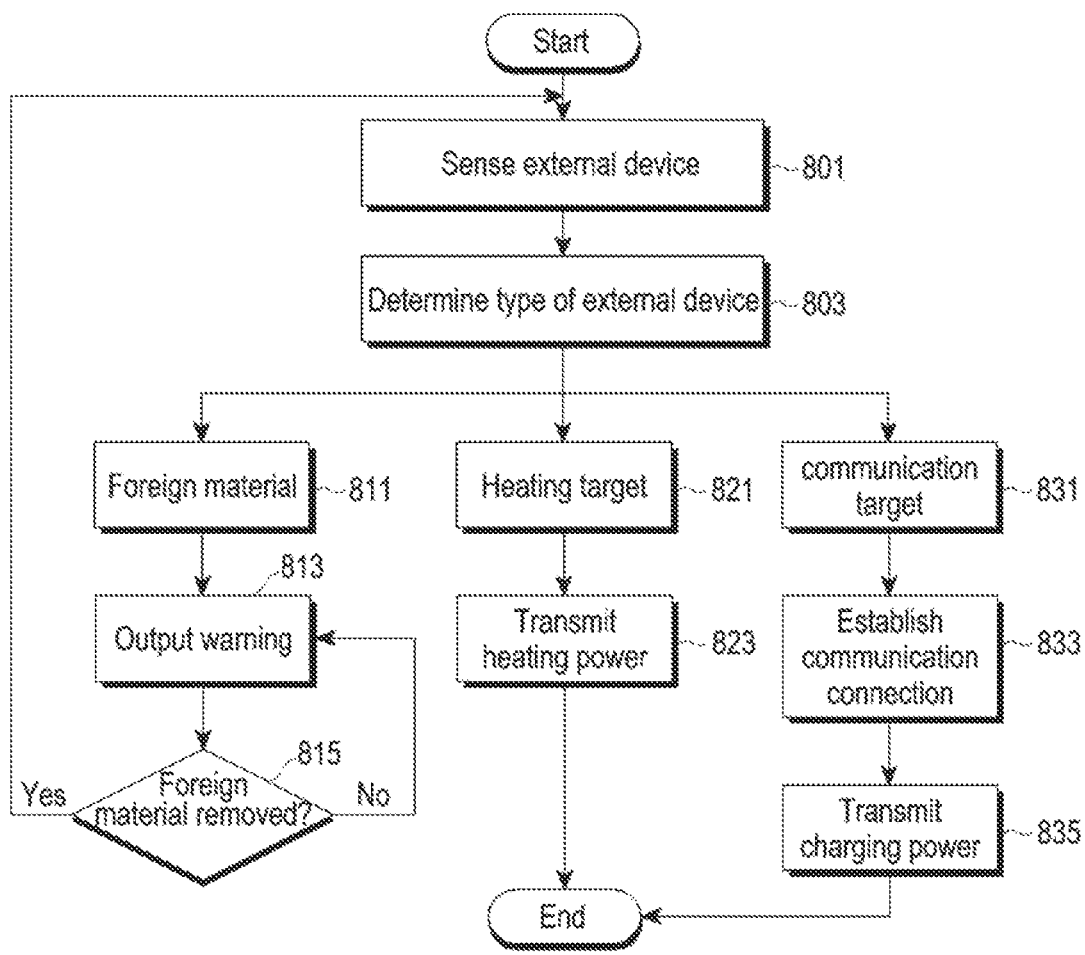
FIG. 8 is a flowchart illustrating a method of operating an electronic device, according to an embodiment.

FIG. 8 is a flowchart illustrating a method of operating an electronic device according to an embodiment.

Referring to FIG. 8, according to an embodiment, the electronic device 100 (e.g., the processor 101) may sense the external device 120 in operation 801.

In operation 803, the electronic device 100 may determine the type of the external device 120. When determining that the external device 120 is a foreign material (operation 811) as a result of determining the type of the sensed external device 120, the electronic device 100 may perform operation 813. When determining that the external device 120 is a heating target (operation 821) as a result of determining the type of the external device 120, the electronic device 100 may perform operation 823. When determining that the external device 120 is a communication target (operation 831) as a result of determining the type of the external device 120, the electronic device 100 may perform operation 833.

In operation 813, the electronic device 100 may output a warning based on determining that the sensed external device 120 is a foreign material. For example, the electronic device 100 may output a warning using the output device 106 based on determining that the sensed external device 120 is a foreign material.

In operation 815, the electronic device 100 may determine whether the external device 120 determined to be a foreign material has been removed. For example, the electronic device 100 may sense the external device 120 disposed on the electronic device 100, and after determining that the sensed external device 120 is a foreign material, determine whether it is no longer sensed. For example, the electronic device 100 may continue to sequentially apply set powers to the power transmission coil 103. When the sensed external device 120 is not removed, at least some of the induction voltages may be sensed as staying in a change occurrence state. When the sensed external device 120 is removed, the induction voltages may return to an original reference voltage (e.g., 5 [V]). The electronic device 100 may determine whether the foreign material has been removed based on the result of sensing each of the sensing coils during a time period in which the set powers are sequentially applied to the power transmission coil 103. When the external device 120 determined to be a foreign material is no longer sensed, the electronic device 100 may perform operation 801. When the external device 120 determined to be a foreign material is sensed again, the electronic device 100 may maintain operation 813.

In operation 823, the electronic device 100 may transmit power to the external device 120 through the power transmission coil 103 based on determining that the sensed external device 120 is a heating target. For example, the electronic device 100 may transmit heating power to the external device 120, and the external device 120 may receive the heating power from the electronic device 100. For example, the heating power may have a specific pulse width, a specific duty cycle, or a specific power level to heat the external device 120. For example, a process of receiving heating power from the electronic device 100 by the external device 120 may be described as a process in which an eddy current flows on the surface of the external device 120 by a magnetic field having a time-variant magnitude formed around the external device 120 by the electronic device 100, and the external device 120 is heated by the eddy current.

In operation 833, the electronic device 100 may establish a communication connection with the external device 120 based on determining that the sensed external device 120 is a communication target. For example, the electronic device 100 may establish the communication connection with the external device 120 through the communication circuit 105. In the case of in-band communication, the electronic device 100 may perform an authentication procedure with the external device 120. In the case of out-of-band communication, the electronic device 100 may form a communication connection (e.g., BLE connection) based on out-of-band communication (e.g., BLE communication) with the external device 120. According to an embodiment, the electronic device 100 may receive, from the external device 120, a signal for authentication of the power transmission coil 103 of the electronic device 100.

In operation 835, the electronic device 100 may transmit power to the external device 120 through the power transmission coil 103. For example, the electronic device 100 may transmit charging power to the external device 120, and the external device 120 may receive the charging power from the electronic device 100. For example, the charging power may have a specific pulse width, a specific duty cycle, or a specific power level to charge the external device 120. For example, the process of receiving charging power from the electronic device 100 by the external device 120 may be described as a process in which as an induced electromotive force is generated in the coil of the external device 120 by a magnetic field having a time-variant magnitude formed around the external device 120 by the electronic device 100, an AC current is output from a coil of the external device 120 or an AC voltage is applied to the coil of the external device.

Figure 9:
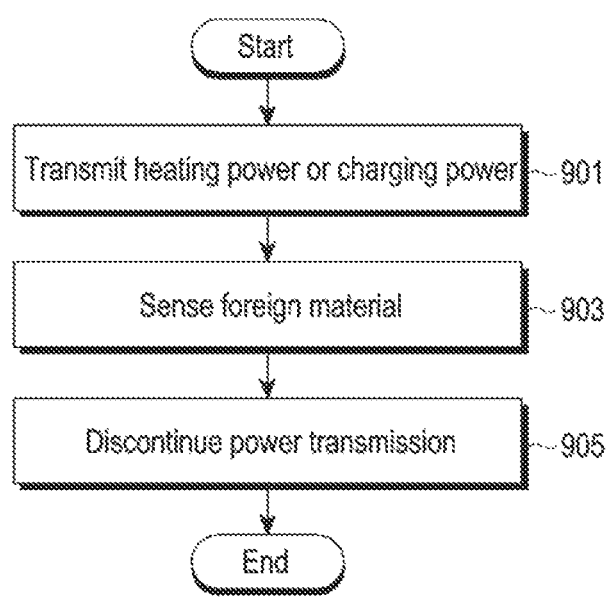
FIG. 9 is a flowchart illustrating a method of operating an electronic device, according to an embodiment.

FIG. 9 is a flowchart illustrating a method of operating an electronic device according to an embodiment.

Referring to FIG. 9, according to an embodiment, the electronic device 100 (e.g., the processor 101) may transmit power to the outside through the power transmission coil 103 in operation 901. For example, when the type of the sensed external device 120 is a heating target, the electronic device 100 may transmit heating power to the external device 120, and when the type of the sensed external device 120 is a charging target, the electronic device 100 may transmit charging power to the external device 120. Further, for example, in a state in which the external device 120 is not sensed, the electronic device 100 may transmit power to the outside through the power transmission coil 103.

In operation 903, the electronic device 100 may sense a foreign material. The sensing of a foreign material may mean an operation of sequentially applying powers corresponding to the above-described respective sensing coils to the power transmission coil, performing a sensing operation on each sensing coil during a period of the power application, and determining whether a foreign material is disposed based on a result of performing the sensing operation. For example, the electronic device 100 may sense the electronic device 120, and sense a foreign material while transmitting power (e.g., heating power) to the sensed external device 120. In another example, the electronic device 100 may sense the external device 120, transmit power (e.g., heating power) to the sensed external device 120, and then sense a foreign material, temporarily discontinuing the power transmission to the external device 120. In another example, the electronic device 100 may sense a foreign material while transmitting power to the outside through the power transmission coil 103 in a state in which the external device 120 is not sensed. In another example, the electronic device 100 may transmit power to the outside through the power transmission coil 103 in the state in which the external device 120 is not sensed, and then sense a foreign material, temporarily discontinuing the power transmission to the external device 120.

In operation 905, based on the foreign material being sensed, the electronic device 100 may stop the transmission of power performed before sensing the foreign material. According to an embodiment, when the electronic device 100 transmits power as in operation 901 and senses a foreign material as in operation 903, the electronic device 100 may immediately stop the transmission of power performed before sensing the foreign material. According to another embodiment, in the case where the electronic device 100 transmits power as in operation 901 and senses a foreign material as in operation 903, when the sensed foreign material is continuously sensed for a preset time or longer, the electronic device 100 may stop the transmission of power performed before sensing the foreign material.

Figure 10:
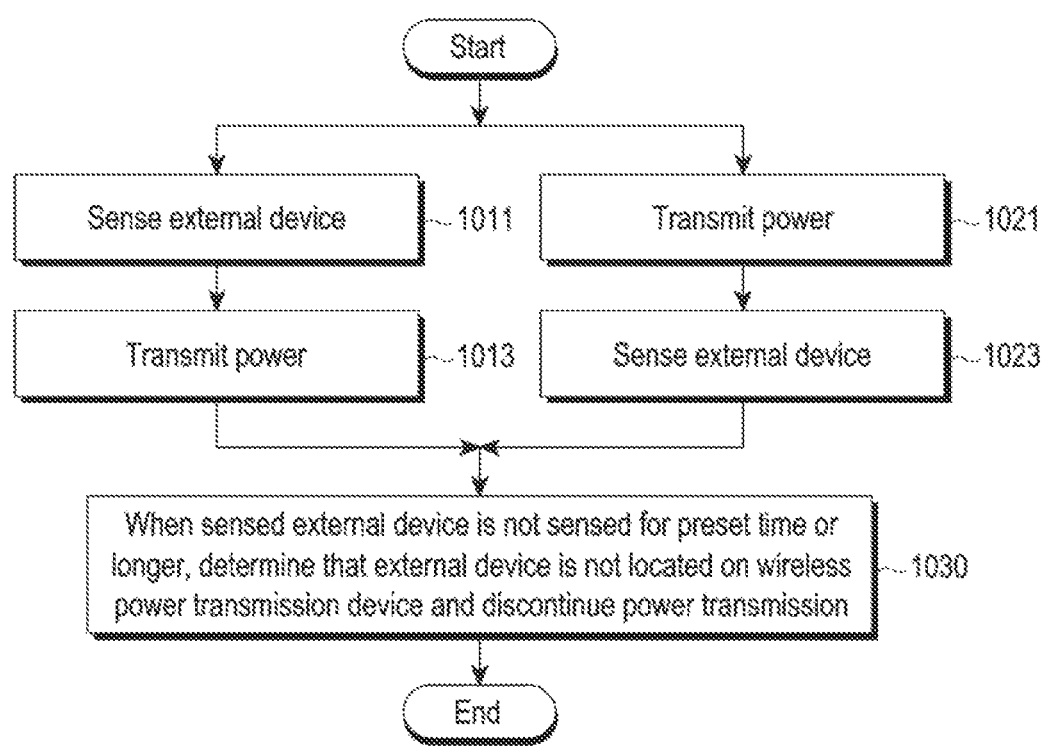
FIG. 10 is a flowchart illustrating a method of operating an electronic device, according to an embodiment.

FIG. 10 is a flowchart illustrating a method of operating an electronic device according to an embodiment.

Referring to FIG. 10, the electronic device 100 (e.g., the processor 101) may sense the external device 120 in operation 1011 and transmit power to the sensed external device 120 in operation 1013 according to an embodiment. Further, according to another embodiment, the electronic device 100 may transmit power to the outside in operation 1021 and sense the external device 120 in operation 1023. When operating in the order of operations 1011 and 1013, the electronic device 100 may first sense the external device 120 and transmit power to the sensed external device 120. When operating in the order of operations 1021 and 1023, the electronic device 100 may first transmit power to the outside and then sense the external device 120. In this case, if the sensed external device 120 is a device capable of receiving power transmitted to the outside by the electronic device 100, the external device 120 sensed according to operation 1023 may receive the power that the electronic device 100 has transmitted in operation 1021.

In operation 1030, when the sensed external device 120 is not sensed for a preset time or longer, the electronic device 100 may determine that the external device 120 is not located on the electronic device 100 and discontinue the power transmission.

Figure 11:
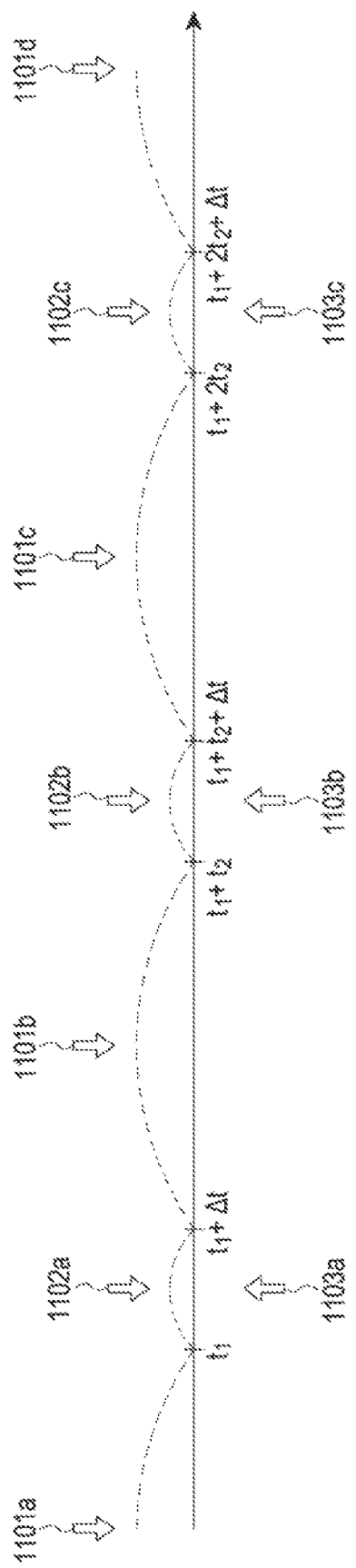
FIG. 11 is a diagram illustrating a method of operating an electronic device, according to an embodiment.

FIG. 11 is a diagram referred to for describing a method of operating an electronic device according to an embodiment.

As described before, the electronic device 100 may identify induction voltages induced to the plurality of sensing coils 104a, 104b, to 104s, and sense the external device 120 based on the identified induction voltages. The electronic device 100 may also transmit power to the external device 120 or the outside through the power transmission coil 103. Accordingly, according to an embodiment, the electronic device 100 may transmit power to the external device 120 or the outside using power applied to the power transmission coil 103. According to another embodiment, the electronic device 100 may sense the external device 120 or the outside using power applied to the power transmission coil 103. Hereinafter, power (e.g., power for transmission) used for power transmission and power (e.g., power for sensing) used for sensing the external device 120 will be separately described. The above-described heating power and charging power are a kind of power for transmission. The power for transmission and the power for sensing may have their respective pulse widths, duty cycles, or power levels. For example, the power for transmission and the power for sensing may have different frequencies. Further, for example, the power for transmission and the power for sensing may have the same frequency.

Referring to FIG. 11, the electronic device 100 (e.g., the processor 101) may periodically sense the external device 120. According to an embodiment, the electronic device 100 may perform an operation of sensing the external device 120 according to a predetermined period, and sense the external device 120 for a predetermined time period during one period. For example, the electronic device 100 may sense the external device 120 according to a predetermined period (e.g., t2), and sense the external device 120 for a predetermined time period (e.g., $\Delta t$) during one period. For example, referring to FIG. 11, the electronic device 100 may sense the external electronic device 120 during a first sensing period from t1 to t1+$\Delta t$, a second sensing period from t1+t2 to t1+t2+$\beta t$, a third sensing period t1+2t2 to t1+2t2+B, or a subsequent periodic sensing period. In this case, the electronic device 100 may apply power for sensing (e.g., 1103a, 1103a, 1103b, or 1103c) to the power transmission coil 103 during the first sensing period, the second sensing period, the third sensing period, or the subsequent periodic sensing period. According to an embodiment, referring to FIG. 3 described above, for example, the process of applying a sensing power 1103a to the power transmission coil 103 during the first sensing period as a process of sequentially applying powers having magnitudes set in correspondence with the plurality of respective sensing coils 104a, 104b, to 104s to the power transmission coil 103 during the first sensing period.

According to an embodiment, referring to FIG. 11, the electronic device 100 may periodically transmit power to the external device 120 or the outside. For example, the electronic device 100 may not transmit power to the external device 120 or the outside while performing the operation of sensing the external device 120. For example, the electronic device 100 may transmit power to the external device 120 or to the outside during a power transmission period, and may temporarily discontinue the power transmission to the external device 120 or to the outside during a period in which the external device 120 is sensed. For example, referring to FIG. 11, the electronic device 100 may apply power for transmission (e.g., 1101a, 1101b, 1101c, or 1101d) to the power transmission coil 103 during a first transmission period to t1, a second transmission period from t1+$\beta$ to t1+t2, a third transmission period from t1+t2+$\beta$ to t1+2t2, a fourth transmission period from t1+2t2+$\beta$ to t1+3t2, or a subsequent periodic transmission period, and apply power for sensing (e.g., 1103a, 1103b, or 1103c), discontinuing the application of the power for transmission (e.g., 1101a, 1101b, 1101c, or 1101d) during the first sensing period, the second sensing period, the third sensing period, or the subsequent periodic sensing period. According to an embodiment, the operation of discontinuing the application of the power for transmission (e.g., 1101a, 1101b, 1101c, or 1101d) during the first sensing period, the second sensing period, the third sensing period, or the subsequent periodic sensing period may be understood as an operation of decreasing the magnitude of power for transmission (e.g., 1102a, 1102b, or 1102c) applied during the first sensing period, the second sensing period, the third sensing period, or the subsequent periodic sensing period to a preset magnitude or less.

According to another embodiment, referring to FIG. 11, the electronic device 100 may continuously transmit power to the external device 120 or to the outside. For example, the electronic device 100 may transmit power to the external device 120 or to the outside even while performing an operation of sensing the external device 120. For example, referring to FIG. 11, the electronic device 100 may transmit power to the external device 120 or to the outside using power for transmission (e.g., 1101a, 1101b, 1101c, or 1101d) during a power transmission period, and may perform an operation of sensing the external device 120 simultaneously with power transmission to the external device 120 or to the outside using power for transmission (e.g., 1102a, 1102b, or 1102c) during a period in which the external device 120 is sensed. In this case, power for sensing (e.g., 1103a, 1103b, or 1103c) may not be applied separately. The power for transmission (e.g., 1102a, 1102b, or 1102c) applied during the sensing period and the power for transmission (e.g., 1101a, 1101b, 1101c, or 1101d) applied during the power transmission period may have the same pulse width, the same duty cycle, or the same power level. For example, the electronic device 100 may maintain the same power applied to the power transmission coil 103 during the power transmission period and the sensing period. According to an embodiment, the electronic device 100 may identify an induction voltage induced in each of the plurality of sensing coils 104a, 104b, to 104s by the power for transmission (e.g., 1102a, 1102b, or 1102c) applied during the sensing period, and sense the external device 120 based on the identified induction voltages. For example, the operation of sensing the external device 120 using the power for transmission (e.g., 1102a, 1102b, or 1102c) applied during the sensing period may be described similarly to operations 303 and 305 of FIG. 3. An embodiment of continuously transmitting power to the external device 120 or to the outside will be additionally described with reference to FIG. 12.

Figure 12:
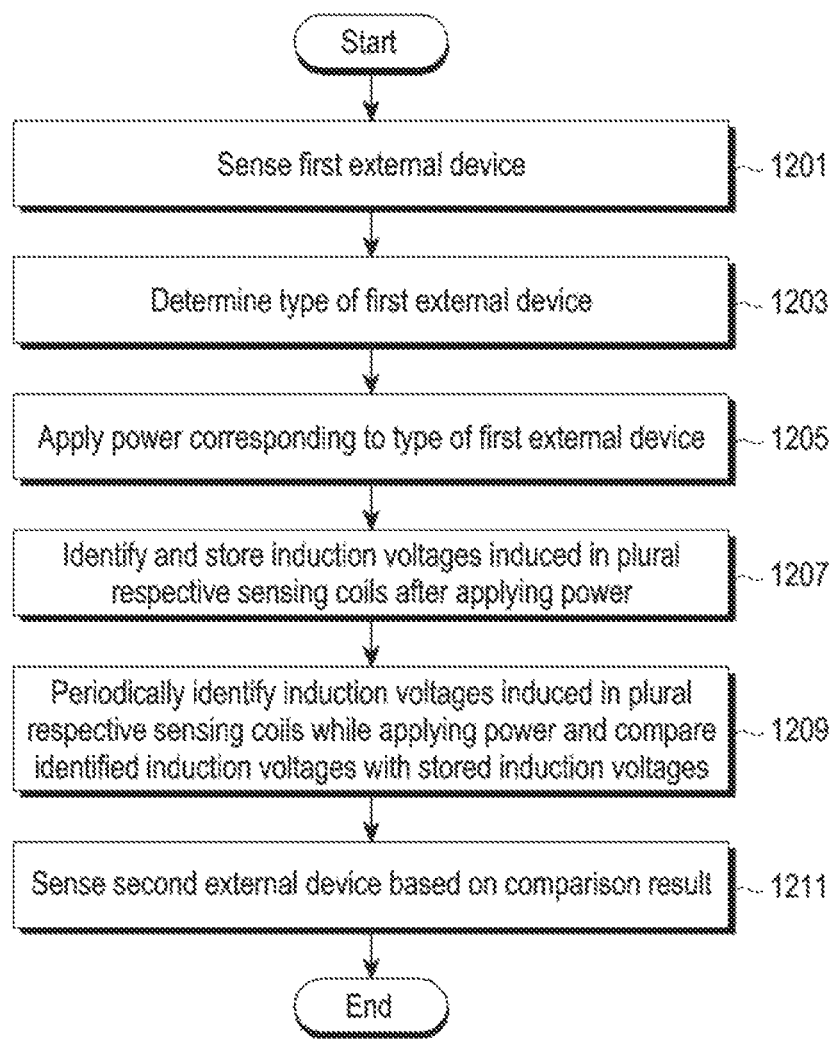
FIG. 12 is a flowchart illustrating a method of operating an electronic device, according to an embodiment.

FIG. 12 is a flowchart illustrating a method of operating an electronic device according to an embodiment.

Referring to FIG. 12, according to an embodiment, the electronic device 100 (e.g., the processor 101) may sense a first external device (e.g., the external device 120) in operation 1201. Operation 1201 may be described similarly to operation 305 of FIG. 3, for example.

In operation 1203, the electronic device 100 may determine the type of the first external device (e.g., the external device 120). Operation 1203 may be described similarly to operation 707 of FIG. 7, for example.

In operation 1205, the electronic device 100 may apply power corresponding to the type of the first external device (e.g., the external device 120) to the power transmission coil 103. Operation 1205 may be described similarly to operation 823 or operation 833 of FIG. 8.

In operation 1207, after applying the power corresponding to the type of the first external device (e.g., the external device 120) to the power transmission coil 103, the electronic device 100 may identify and store induction voltages in the plurality of sensing coils 104a, 104b, to 104s.

In operation 1209, the electronic device 100 may periodically identify induction voltages induced in the plurality of respective sensing coils 104a, 104b, to 104s while applying the power corresponding to the type of the first external device (e.g., the external device 120) to the power transmission coil 103, and compare the periodically identified induction voltages with the induction voltages stored in operation 1207.

In operation 1211, the electronic device 100 may sense a second external device (e.g., foreign material) based on a result of the comparison of operation 1209. Operation 1211 may be described similarly to operation 305 of FIG. 3, for example.

According to various embodiments, a wireless power transmission device (e.g., the electronic device 100) may include a plurality of sensing coils (e.g., the plurality of sensing coils 104a, 104b, to 104s) for sensing an external device, a power transmission coil (e.g., the power transmission coil 103) transmitting power to the external device, and a processor (e.g., the processor 101). The processor may be configured to sequentially apply powers having magnitudes set in correspondence with the plurality of respective sensing coils to the power transmission coil, identify an induction voltage induced in each of the plurality of sensing coils during a period in which a power corresponding to each of the plurality of sensing coils among the powers is applied, and sense the external device located on the wireless power transmission device based on the identified induction voltages.

According to various embodiments, the induction voltage induced in each of the plurality of sensing coils during the period in which the power corresponding to each of the plurality of sensing coils among the powers is applied may be a preset value while the external device is not disposed on the wireless power transmission device.

According to various embodiments, the processor may be further configured to identify and store a magnitude of each of the powers leading to measurement of the induction voltage induced in each of the plurality of sensing coils as a preset value.

According to various embodiments, the processor may be configured to determine that the external device is sensed, when the induction voltage induced in each of the plurality of sensing coils during the period in which the power corresponding to each of the plurality of sensing coils among the powers is applied is different from a preset value by a certain value or larger.

According to various embodiments, the processor may be further configured to determine a type of the sensed external device by comparing a pre-stored pattern with the induction voltage induced in each of the plurality of sensing coils during the period in which the power corresponding to each of the plurality of sensing coils among the powers is applied.

According to various embodiments, the processor may be further configured to discontinue the transmission of the power, when it is determined that the type of the sensed external device is a foreign material, and the sensed external device is continuously sensed for a preset time or longer.

According to various embodiments, the processor may be further configured to determine that the external device is not located on the wireless power transmission device and discontinue the transmission of the power, when the sensed external device is not sensed for a preset time or longer.

According to various embodiments, the processor may be configured to sequentially apply the powers having the magnitudes set in correspondence with the plurality of respective sensing coils to the power transmission coil according to a preset period.

According to various embodiments, frequencies of the powers sequentially applied to the power transmission coil according to the preset period to sense the external electronic device may be different from a frequency of a power applied to the power transmission coil to transmit the power to the external electronic device.

According to various embodiments, the processor may be further configured to decrease a magnitude of the power applied to the power transmission coil to transmit the power to the external electronic device to a preset magnitude or less, when the powers are sequentially applied to the power transmission coil according to the preset period to sense the external electronic device.

According to various embodiments, a method of operating a wireless power transmission device including a plurality of sensing coils for sensing an external device, and a power transmission coil transmitting power to the external device may include sequentially applying powers having magnitudes set in correspondence with the plurality of respective sensing coils to the power transmission coil, identifying an induction voltage induced in each of the plurality of sensing coils during a period in which a power corresponding to each of the plurality of sensing coils among the powers is applied, and sensing the external device located on the wireless power transmission device based on the identified induction voltages.

According to various embodiments, the induction voltage induced in each of the plurality of sensing coils during the period in which the power corresponding to each of the plurality of sensing coils among the powers is applied may be a preset value while the external device is not disposed on the wireless power transmission device.

According to various embodiments, the method may further include identifying and storing a magnitude of each of the powers leading to measurement of the induction voltage induced in each of the plurality of sensing coils as a preset value.

According to various embodiments, sensing the external device may include determining that the external device is sensed, when the induction voltage induced in each of the plurality of sensing coils during the period in which the power corresponding to each of the plurality of sensing coils among the powers is applied is different from a preset value by a certain value or larger.

According to various embodiments, the method may further include determining a type of the sensed external device by comparing a pre-stored pattern with the induction voltage induced in each of the plurality of sensing coils during the period in which the power corresponding to each of the plurality of sensing coils among the powers is applied.

According to various embodiments, the method may further include discontinuing the transmission of the power, when it is determined that the type of the sensed external device is a foreign material, and the sensed external device is continuously sensed for a preset time or longer.

According to various embodiments, the method may further include determining that the external device is not located on the wireless power transmission device and discontinuing the transmission of the power, when the sensed external device is not sensed for a preset time or longer.

According to various embodiments, sequentially applying the powers having the magnitudes set in correspondence with the plurality of respective sensing coils to the power transmission coil may be sequentially applying the powers to the power transmission coil according to a preset period.

According to various embodiments, frequencies of the powers sequentially applied to the power transmission coil according to the preset period to sense the external electronic device may be different from a frequency of a power applied to the power transmission coil to transmit the power to the external electronic device.

According to various embodiments, the method may further include decreasing a magnitude of the power applied to the power transmission coil to transmit the power to the external electronic device to a preset magnitude or less, when the powers are sequentially applied to the power transmission coil according to the preset period to sense the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wireless power transmission device comprising:
   a plurality of sensing coils configured to sense an external device;
   a power transmission coil configured to transmit power to the external device; and
   a processor configured to:
      sequentially apply powers having magnitudes set to respectively correspond to each sensing coil of the plurality of sensing coils to the power transmission coil,
      identify an induction voltage induced in each sensing coil of the plurality of sensing coils during a period in which the power corresponding to each sensing coil of the plurality of sensing coils among the powers is applied,
      sense the external device located on the wireless power transmission device based on the identified induction voltages;
      determine that the external device is sensed based on the induction voltage induced in each sensing coil of the plurality of sensing coils during the period in which the power corresponding to each sensing coil of the plurality of sensing coils among the powers is applied being different from a preset value by at least a predetermined amount;
      based on a number of the plurality of sensing coils in which the power that is applied is different from the preset value being less than a predetermined number of coils, determine a type of the external device to be a foreign material and stop the transmission of the power to the external device; and
      based on the number of the plurality of sensing coils in which the power that is applied is different from the preset value being greater than the predetermined number of coils, determine the type of the external device to be a heating target and continue the transmission of the power to the external device.

2. The wireless power transmission device of claim 1, wherein the induction voltage induced in each sensing coil of the plurality of sensing coils during the period in which the power corresponding to each sensing coil of the plurality of sensing coils among the powers is applied is the preset value based on the external device not being disposed on the wireless power transmission device.

3. The wireless power transmission device of claim 1, wherein the processor is further configured to identify and store a magnitude of each of the powers leading to measurement of the induction voltage induced in each of the plurality of sensing coils as the preset value.

4. The wireless power transmission device of claim 1, wherein the processor is further configured to determine the type of the sensed external device by comparing a pre-stored pattern with the induction voltage induced in each sensing coil of the plurality of sensing coils during the period in which the power corresponding to each sensing coil of the plurality of sensing coils among the powers is applied.

5. The wireless power transmission device of claim 1, wherein the processor is further configured to determine that the external device is not located on the wireless power transmission device and stop the transmission of the power, based on the sensed external device not being sensed for at least a preset amount of time.

6. The wireless power transmission device of claim 1, wherein the processor is further configured to sequentially apply the powers having the magnitudes set to respectively correspond to each sensing coil of the plurality of sensing coils to the power transmission coil according to a preset period.

7. The wireless power transmission device of claim 6, wherein frequencies of the powers sequentially applied to the power transmission coil according to the preset period to sense the external device are different from a frequency of the power applied to the power transmission coil to transmit the power to the external device.

8. The wireless power transmission device of claim 7, wherein the processor is further configured to decrease a magnitude of the power applied to the power transmission coil to transmit the power to the external device to a preset magnitude or less, based on the powers being sequentially applied to the power transmission coil according to the preset period to sense the external device.

9. A method of operating a wireless power transmission device including a plurality of sensing coils for sensing an external device, and a power transmission coil transmitting power to the external device, the method comprising:
sequentially applying powers having magnitudes set to respectively correspond to each sensing coil of the plurality of sensing coils to the power transmission coil,
identifying an induction voltage induced in each sensing coil of the plurality of sensing coils during a period in which the power corresponding to each sensing coil of the plurality of sensing coils among the powers is applied,
sensing the external device located on the wireless power transmission device based on the identified induction voltages;
determining that the external device is sensed based on the induction voltage induced in each sensing coil of the plurality of sensing coils during the period in which the power corresponding to each sensing coil of the plurality of sensing coils among the powers is applied being different from a preset value by at least a predetermined amount;
based on a number of the plurality of sensing coils in which the power that is applied is different from the preset value being less than a predetermined number of coils, determining a type of the external device to be a foreign material and stopping the transmission of the power to the external device; and
based on the number of the plurality of sensing coils in which the power that is applied is different from the preset value being greater than the predetermined number of coils, determining the type of the external device to be a heating target and continuing the transmission of the power to the external device.

10. The method of claim 9, wherein the induction voltage induced in each sensing coil of the plurality of sensing coils during the period in which the power corresponding to each sensing coil of the plurality of sensing coils among the powers is applied is the preset value based on the external device not being disposed on the wireless power transmission device.

11. The method of claim 9, further comprising identifying and storing a magnitude of each of the powers leading to measurement of the induction voltage induced in each of the plurality of sensing coils as the preset value.

12. The method of claim 9, further comprising determining the type of the sensed external device by comparing a pre-stored pattern with the induction voltage induced in each sensing coil of the plurality of sensing coils during the period in which the power corresponding to each sensing coil of the plurality of sensing coils among the powers is applied.

* * * * *